(12) United States Patent
Sato et al.

(10) Patent No.: US 6,762,890 B2
(45) Date of Patent: Jul. 13, 2004

(54) SINGLE FOCUS LENS

(75) Inventors: Kenichi Sato, Ageo (JP); Tetsuya Ori, Koshigaya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/358,237

(22) Filed: Feb. 5, 2003

(65) Prior Publication Data

US 2003/0161050 A1 Aug. 28, 2003

(30) Foreign Application Priority Data

Feb. 13, 2002 (JP) ........................................ 2002-034998

(51) Int. Cl.[7] .............................. G02B 9/34; G02B 13/04
(52) U.S. Cl. ........................ 359/771; 359/753; 359/781
(58) Field of Search .............................. 359/771, 781, 359/682, 753, 650, 715

(56) References Cited

U.S. PATENT DOCUMENTS 5,963,375 A 10/1999 Kreitzer
5,999,337 A 12/1999 Ozaki
2003/0142417 A1 * 7/2003 Chen ........................... 359/753

FOREIGN PATENT DOCUMENTS

| JP | 5-157962 | 6/1993 |
| JP | 11-125767 | 5/1999 |

* cited by examiner

*Primary Examiner*—Georgia Epps
*Assistant Examiner*—Alicia M. Harrington
(74) *Attorney, Agent, or Firm*—Arnold International; Bruce Y. Arnold

(57) ABSTRACT

A single focus lens is composed of four lens components of negative, positive, negative and positive refractive power, respectively, in order from the object side. The first lens, in order from the object side, has a concave surface on the image side, and a stop is positioned between the first lens and the second lens. The second lens has a convex surface on the object side, the third lens has a concave surface on the object side, and the fourth lens has a convex, aspherical surface on the image side such that the refractive power of the fourth lens becomes weaker towards the edge of the lens. Specified conditions are preferably satisfied in order to provide favorable correction of aberrations.

12 Claims, 4 Drawing Sheets

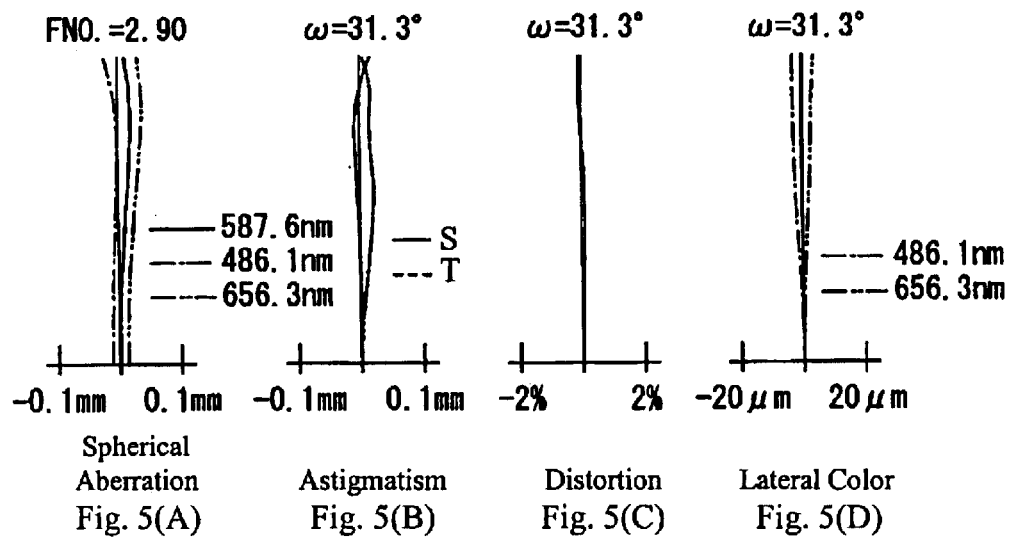
Spherical Aberration
Fig. 5(A)
Astigmatism
Fig. 5(B)
Distortion
Fig. 5(C)
Lateral Color
Fig. 5(D)
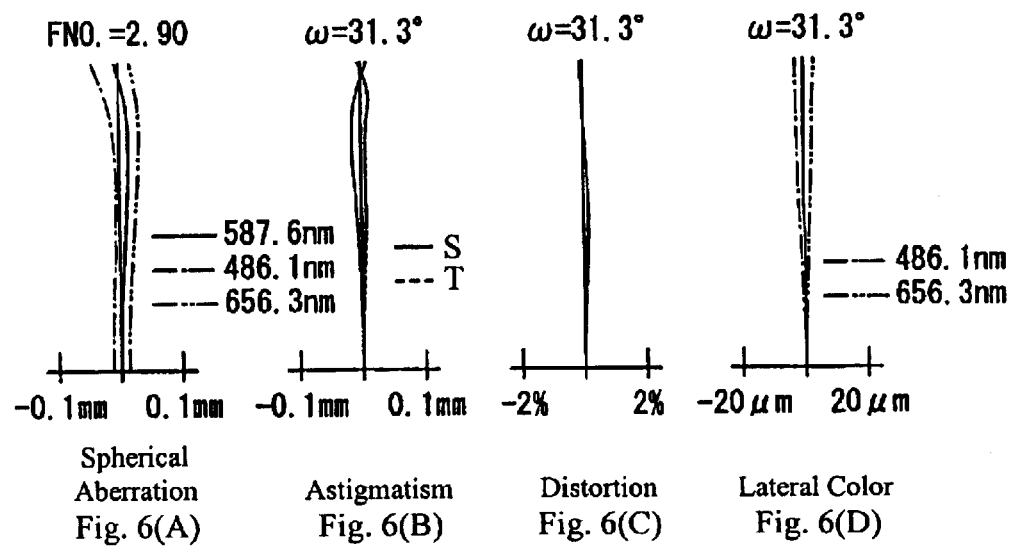
Spherical Aberration
Fig. 6(A)
Astigmatism
Fig. 6(B)
Distortion
Fig. 6(C)
Lateral Color
Fig. 6(D)

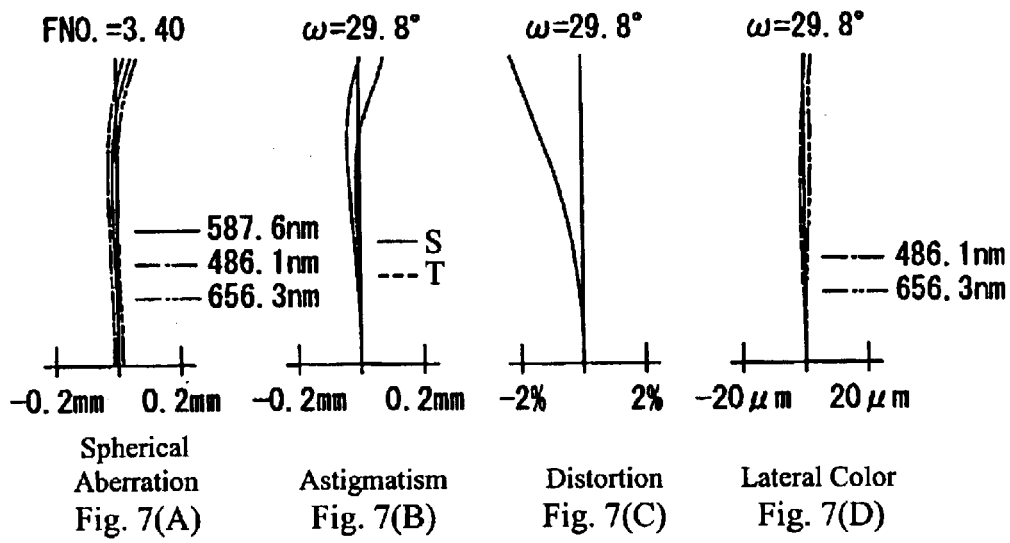
Spherical Aberration
Fig. 7(A)
Astigmatism
Fig. 7(B)
Distortion
Fig. 7(C)
Lateral Color
Fig. 7(D)
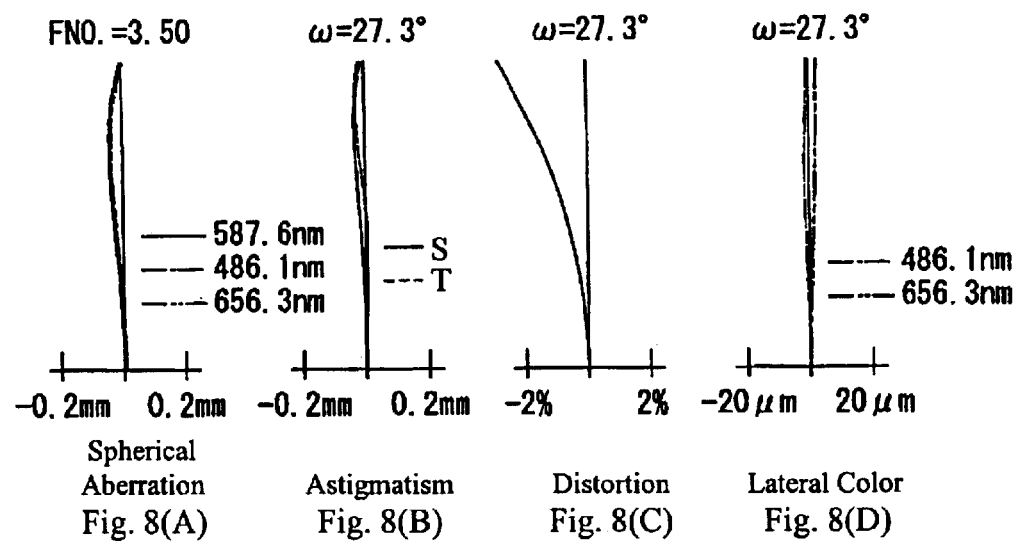
Spherical Aberration
Fig. 8(A)
Astigmatism
Fig. 8(B)
Distortion
Fig. 8(C)
Lateral Color
Fig. 8(D)

SINGLE FOCUS LENS

BACKGROUND OF THE INVENTION

In recent years, digital cameras that are used to input imaging information of landscapes, persons, etc., into a personal computer have been rapidly increasing in popularity as the use of the personal computer in our daily life increases. The digital camera is an instrument which converts optical images into electrical signals using an image sensor such as a charge coupled device (CCD) and records them as digital image data. Conventional imaging lenses for use in digital cameras are disclosed in Japanese Laid Open Patent Applications H5-157962 and H11-125767.

Generally speaking, digital cameras are required to have a compact construction and to provide high-resolution images. Thus, the lens used in digital cameras must be compact and provide a high resolution. In addition, due to the requirements of CCD image sensors, it is desirable that the light rays that are incident onto the image sensor surface be nearly perpendicular to the detecting surface. Therefore, it is desirable that the imaging lens used in a digital camera be nearly telecentric. The imaging lenses disclosed in Japanese Laid Open Patent Applications H5-157962 and H11-125767 do not satisfy the requirements of compactness, high resolution, and low production cost as is needed for digital cameras that require a high resolution.

BRIEF SUMMARY OF THE INVENTION

The present invention relates to a single focus lens, more particularly, one suitable for use in a digital still camera (hereinafter referred to simply as a digital camera). The object of the present invention is to provide a single focus lens having a high resolution and low production cost that is suitable for use in a digital camera having a compact construction.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 5(A)–5(D) show the spherical aberration, astigmatism, distortion, and lateral color, respectively, of the single focus lens of Embodiment 1;

FIGS. 6(A)–6(D) show the spherical aberration, astigmatism, distortion, and lateral color, respectively, of the single focus lens of Embodiment 2;

FIGS. 7(A)–7(D) show the spherical aberration, astigmatism, distortion, and lateral color, respectively, of the single focus lens of Embodiment 3; and FIGS. 8(A)–8(D) show the spherical aberration, astigmatism, distortion, and lateral color, respectively, of the single focus lens of Embodiment 4.

DETAILED DESCRIPTION

Figure 1:
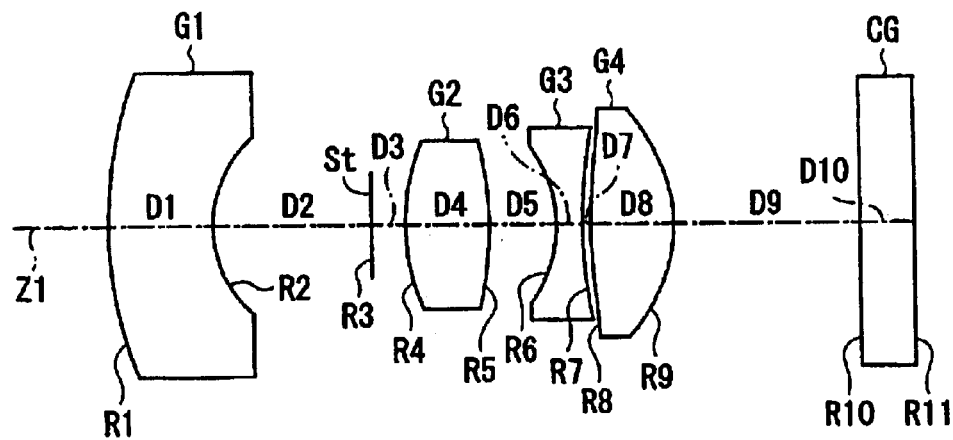
FIG. 1 shows the basic lens element configuration of a single focus lens according to Embodiment 1 of the present invention.

The invention will first be discussed in general terms. The single focus lens of the present invention is formed of, in order from the object side: a first lens element of negative refractive power having a concave surface on the image side; a stop; a second lens element of positive refractive power having a convex surface on the object side; a third lens element of negative refractive power having a concave surface on the object side; and a fourth lens element of positive refractive power having a convex lens surface on the image side that is aspherical such that the refractive power of this surface becomes weaker towards the periphery of the lens, and wherein the following Conditions (1) and (2) are satisfied:

$$|R1/R2| > 2 \quad \text{Condition (1)}$$

$$D5/Y\text{max} > 0.05 \quad \text{Condition (2)}$$

where

R1 is the radius of curvature near the optical axis of the lens surface on the object side of the first lens element, R2 is the radius of curvature near the optical axis of the lens surface on the image side of the first lens element, D5 is the on-axis spacing between the second lens element and the third lens element, and Ymax is the maximum image height.

Furthermore, in the first two embodiments, the fourth lens element has aspherical surfaces on both sides. In the third and fourth embodiments only the image side of the fourth lens element is aspherical; however, in these embodiments both sides of the first lens element are made to be aspherical. In all embodiments, those surfaces that are aspherical have a shape defined by the following equation:

$$Z = [CY^2/\{1+(1-KC^2Y^2)^{1/2}\}] + A_4Y^4 + A_6Y^6 + A_8Y^8 + A_{10}Y^{10} \quad \text{(Equation A)}$$

where

Z is the length (in mm) of a line drawn from a point on the aspherical surface at a distance Y from the optical axis to the tangential plane of the aspherical surface vertex, C (=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

In the single focus lens of the present invention, lens properties suitable for use in a digital camera having a compact construction include favorably correcting the various aberrations so that high quality images are formed using a lens that itself is compact in size and has a short overall focal length. More particularly, curvature of field toward the image side and distortion are favorably corrected by using an aspherical lens surface on the image side of the fourth lens element. In addition, various aberrations are favorably corrected by satisfying Conditions (1) and (2) above.

In the single focus lens according to the first two embodiments of the invention, to be discussed in detail later, the fourth lens element, in order from the object side, is desirably aspherical on both sides.

The single focus lens in accordance with the third and fourth embodiments differs from that of the first two embodiments in that the third and fourth embodiments employ aspherical surfaces on both sides of the first lens element and do not employ an aspherical surface on the object side of the fourth lens element. This construction enables the single focus lens of the third and fourth embodiments to have a shorter overall length, and thus the single focus lens is more compact. In addition, the lens of the third and fourth embodiments satisfies the following Condition 3:

$$D2/f < 0.1 \qquad \text{Condition (3)}$$

where

D2 is the on-axis spacing between the first lens element and the stop, and f is the focal length of the single focus lens.

Satisfying the above Condition (3) ensures that the stop position is set at a distant position from the image surface in order to maintain a long pupil distance and thereby make the single focus lens nearly telecentric.

In the single focus lens according to the third and fourth embodiments of the present invention, curvature of field toward the image side and distortion are favorably corrected by making aspherical the image-side surface of the fourth lens element. As with the first two embodiments, various aberrations are also favorably corrected by satisfying the above Conditions (1) and (2). More particularly, the aspherical lens surface on the image side of the first lens element favorably corrects the distortion.

Four specific embodiments of the present invention will now be described in detail, with reference to the drawings.

Embodiment 1

FIG. 1 shows the basic lens element configuration of a single focus lens according to Embodiment 1 of the present invention. The single focus lens of this embodiment is particularly suitable for use as a photographic main lens of a compact digital camera.

The single focus lens is formed of, in order from the photographic object side and arranged along the optical axis Z1: a first lens G1, a stop St, a second lens G2, a third lens G3, and a fourth lens G4. A CCD (not shown) is positioned at the image surface of the single focus lens. A cover glass CG is positioned immediately before the image-sensing surface of the CCD in order to protect the CCD elements thereof.

In this embodiment, the first lens G1 is a negative meniscus lens element, the second lens G2 is biconvex, the third lens G3 is biconcave, and the fourth lens G4 is biconvex. Further, it is preferred that both sides of the fourth lens G4 be aspherical in order to favorably correct aberrations of the single focus lens.

Table 1 below lists the surface number #, in order from the object side, the radius of curvature R (in mm) of each surface near the optical axis, the on-axis surface spacing D (in mm), as well as the index of refraction $N_d$ and the Abbe number $v_d$ (at the d-line, λ=587.6 nm) of each optical element according to Embodiment 1 of the present invention, including the cover glass CG. The bottom portion of Table 1 lists the focal length f, the F-number $F_{NO}$, the picture angle 2ω, as well as the values of the ratios listed in Conditions (1) and (2) for Embodiment 1.

TABLE 1

| # | R | D | $N_d$ | $v_d$ |
|---|---|---|---|---|
| 1 | 10.114 | 2.500 | 1.5434 | 47.2 |
| 2 | 2.922 | 3.771 | | |
| 3 (stop) | ∞ | 0.800 | | |
| 4 | 5.195 | 2.000 | 1.8064 | 46.7 |
| 5 | −8.306 | 1.608 | | |
| 6 | −3.267 | 0.600 | 1.8550 | 23.8 |
| 7 | 11.887 | 0.203 | | |
| 8* | 10.733 | 2.000 | 1.7469 | 49.2 |
| 9* | −3.720 | 4.436 | | |
| 10 | ∞ | 1.300 | 1.5168 | 64.2 |
| 11 | ∞ | | | | f = 5.42 mm    $F_{NO}$ = 2.9    2ω = 62.6°
|R1/R2| = 3.461    D5/Ymax = 0.487

As is apparent from comparing the values listed in the last row of Table 1 with Conditions (1) and (2), Conditions (1) and (2) are both satisfied for this embodiment.

Table 2 below lists, for the aspherical surfaces (#8 and #9 above), the values of the constant K and of the aspherical coefficients $A_4$, $A_6$, $A_8$, and $A_{10}$ for Equation (A) above.

TABLE 2

| # | K | $A_4$ | $A_6$ | $A_8$ | $A_{10}$ |
|---|---|---|---|---|---|
| 8 | 1.00139 | −3.62483E−3 | 2.20423E−4 | −9.17025E−6 | −6.78491E−7 |
| 9 | 1.16478 | 2.67298E−3 | −3.51457E−5 | 2.79867E−5 | −7.59270E−7 |

An "E" in the data above indicates that the number following is the exponent to the base 10. For example, "1.0E-02" represents $1.0 \times 10^{-2}$.

The single focus lens according to this embodiment has only a single aspherical lens (G4, of which both sides are aspherical) and the position of the stop St is placed relatively near to the second lens G2. This construction is suitable for cost reduction since there is only one aspherical lens element and it provides a single focus lens having a low F-number.

By adopting the construction as described above, the overall length of the lens, namely the distance from the refractive surface of G1 on the object side to the refractive surface of G4 on the image side, is reduced. Thus, this construction enables a compact, single focus lens suitable for use in a digital camera to be produced.

In the single focus lens of this embodiment, curvature of field toward the image side and distortion are improved by means of using an aspherical surface on the image-side of the fourth lens G4. In addition, various aberrations are favorably corrected by satisfying the above Conditions (1) and (2). More particularly, curvature of field toward the image side and the distortion are favorably corrected by satisfying Condition (1) above, and the astigmatism and distortion are favorably corrected by satisfying Condition (2).

FIGS. 5(A)–5(D) show the spherical aberration, astigmatism, distortion and lateral color, respectively, of the single focus lens according to this embodiment. The spherical aberrations are shown for the wavelengths of 587.6 nm (the d-line), 486.1 nm (the F-line), and 656.3 nm (the C-line). In FIGS. 5(B) and 5(C) the aberrations shown are for the d-line, and in FIG. 5(D) the aberrations are for, as indicated, 486.1 nm (the F-line) and 656.3 nm (the C-line). Also in these drawings, ω is the half-image angle. As is apparent from these figures, the various aberrations are favorably corrected for Embodiment 1.

Embodiment 2

Figure 2:
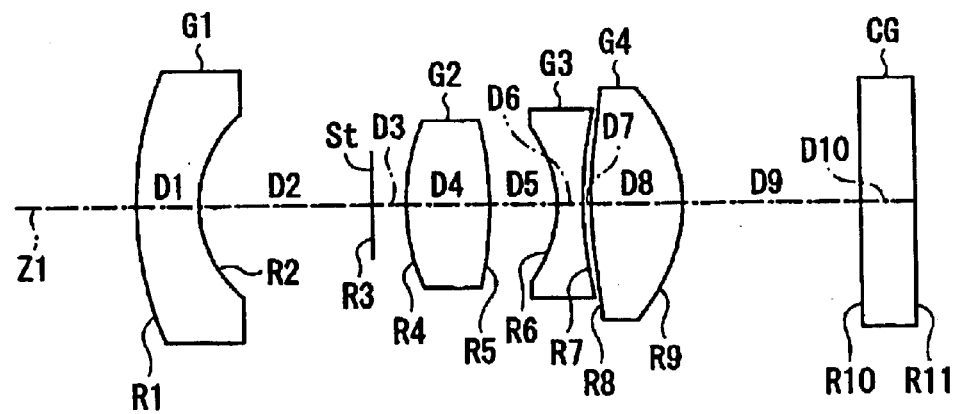
FIG. 2 shows the basic lens element configuration of a single focus lens according to Embodiment 2 of the present invention.

FIG. 2 shows the basic lens element configuration of a single focus lens according to Embodiment 2 of the present invention. Although the lens construction parameters differ in their details, as is apparent by comparing Table 2 below with Table 1 above, the basic lens element configuration is the same as in Embodiment 1.

Table 3 below lists the surface number #, in order from the object side, the radius of curvature R (in mm) of each surface near the optical axis, the on-axis surface spacing D (in mm), as well as the index of refraction $N_d$ and the Abbe number $\nu_d$ (at the d-line, λ=587.6 nm) of each optical element according to Embodiment 2 of the present invention, including the cover glass CG. The bottom portion of Table 3 lists the focal length f, the F-number $F_{NO}$, the picture angle 2ω, as well as the values of the ratios listed in Conditions (1) and (2) for Embodiment 2.

TABLE 3

| # | R | D | $N_d$ | $\nu_d$ |
|---|---|---|---|---|
| 1 | 8.648 | 1.500 | 1.4875 | 47.2 |
| 2 | 2.964 | 4.113 | | |
| 3 (stop) | ∞ | 0.800 | | |
| 4 | 5.011 | 2.000 | 1.7433 | 46.7 |
| 5 | −8.508 | 1.605 | | |
| 6 | −3.159 | 0.600 | 1.8052 | 23.8 |
| 7 | 9.877 | 0.200 | | |
| 8* | 9.450 | 2.200 | 1.6691 | 49.2 |
| 9* | −3.779 | 4.245 | | |
| 10 | ∞ | 1.300 | 1.5168 | 64.2 |
| 11 | ∞ | | | | f = 5.42 mm  $F_{NO}$ = 2.9  2ω = 62.6°
|R1/R2| = 2.918  D5/Ymax = 0.486

As is apparent from comparing the values listed in the last row of Table 3 with Conditions (1) and (2), Conditions (1) and (2) are both satisfied for this embodiment.

Table 4 below lists, for the aspherical surfaces (#8 and #9 above), the values of the constant K and of the aspherical coefficients $A_4$, $A_6$, $A_8$, and $A_{10}$ for Equation (A) above.

An "E" in the data above indicates that the number following is the exponent to the base 10. For example, "1.0E-02" represents $1.0 \times 10^{-2}$.

FIGS. 6(A)–6(D) show the spherical aberration, astigmatism, distortion and lateral color, respectively, of the single focus lens according to this embodiment. The spherical aberrations are shown for the wavelengths of 587.6 nm (the d-line), 486.1 nm (the F-line), and 656.3 nm (the C-line). In FIGS. 6(B) and 6(C) the aberrations shown are for the d-line, and in FIG. 6(D) the aberrations are for, as indicated, 486.1 nm (the F-line) and 656.3 nm (the C-line). Also in these drawings, ω is the half-image angle. As is apparent from these figures, the various aberrations are favorably corrected for Embodiment 2.

Embodiment 3

Figure 3:
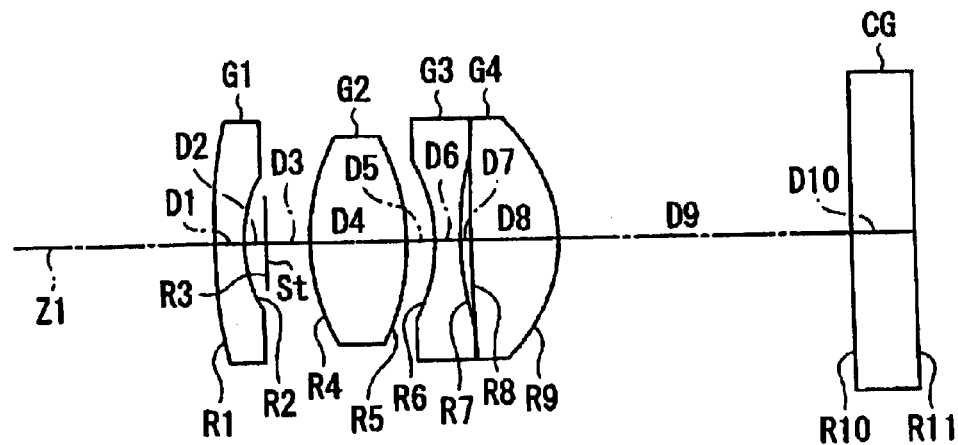
FIG. 3 shows the basic lens element configuration of a single focus lens according to Embodiment 3 of the present invention.

FIG. 3 shows the basic lens element configuration of a single focus lens according to Embodiment 3 of the present invention. In this embodiment, both lens surfaces of the first lens G1 (surfaces #1 and #2) and the image-side surface of the fourth lens G4 (surface #9) are aspherical.

Table 5 below lists the surface number #, in order from the object side, the radius of curvature R (in mm) of each surface near the optical axis, the on-axis surface spacing D (in mm), as well as the index of refraction $N_d$ and the Abbe number $\nu_d$ (at the d-line, λ=587.6 nm) of each optical element according to Embodiment 3 of the present invention, including the cover glass CG. The bottom portion of Table 5 lists the focal length f, the F-number $F_{NO}$, the picture angle 2ω, as well as the values of the ratios listed in Conditions (1)–(3) for Embodiment 3.

TABLE 5

| # | R | D | $N_d$ | $\nu_d$ |
|---|---|---|---|---|
| 1* | 47.787 | 0.600 | 1.56865 | 58.6 |
| 2* | 3.400 | 0.450 | | |
| 3 (stop) | ∞ | 0.900 | | |
| 4 | 4.675 | 1.950 | 1.83400 | 37.2 |
| 5 | −4.675 | 0.576 | | |
| 6 | −3.392 | 0.500 | 1.84666 | 23.8 |
| 7 | 7.127 | 0.216 | | |
| 8 | 59.243 | 1.800 | 1.69098 | 53.0 |
| 9* | −3.062 | 6.020 | | |
| 10 | ∞ | 1.300 | 1.51680 | 64.2 |
| 11 | ∞ | | | | f = 6.26 mm  $F_{NO}$ = 3.4  2ω = 59.6°
|R1/R2| = 14.055  D5/Ymax = 0.175  D2/f = 0.072

As is apparent from comparing the values listed in the last row of Table 5 with Conditions (1)–(3), Conditions (1)–(3) are each satisfied for this embodiment.

Table 6 below lists, for the aspherical surfaces (#1, #2 and #9 above), the values of the constant K and of the aspherical coefficients $A_4$, $A_6$, $A_8$, and $A_{10}$ for Equation (A) above.

TABLE 4

| # | K | $A_4$ | $A_6$ | $A_8$ | $A_{10}$ |
|---|---|---|---|---|---|
| 8 | 1.02759 | −3.49038E−3 | 2.34773E−4 | −1.94407E−5 | 3.54623E−7 |
| 9 | 2.99342E−1 | 7.84910E−4 | −1.74397E−4 | 3.25122E−5 | −2.56005E−6 |

TABLE 6

| # | K | $A_4$ | $A_6$ | $A_8$ | $A_{10}$ |
|---|---|---|---|---|---|
| 1 | −2.38751E+1 | 8.88268E−3 | −8.74691E−4 | 2.32983E−5 | 1.28404E−7 |
| 2 | 2.86308 | 8.44777E−3 | 3.01853E−4 | −2.29202E−7 | 1.29847E−8 |
| 9 | 2.00192E−2 | −1.94599E−3 | −1.44249E−4 | 1.55436E−5 | −1.91172E−8 |

An "E" in the data above indicates that the number following is the exponent to the base 10. For example, "1.0E-02" represents $1.0 \times 10^{-2}$.

FIGS. 7(A)–7(D) show the spherical aberration, astigmatism, distortion and lateral color, respectively, of the single focus lens according to this embodiment. The spherical aberrations are shown for the wavelengths of 587.6 nm (the d-line), 486.1 nm (the F-line), and 656.3 nm (the C-line). In FIGS. 7(B) and 7(C) the aberrations shown are for the d-line, and in FIG. 7(D) the aberrations are for, as indicated, 486.1 nm (the F-line) and 656.3 nm (the C-line). Also in these drawings, ω is the half-image angle. As is apparent from these figures, the various aberrations are favorably corrected for Embodiment 3.

Embodiment 4

Figure 4:
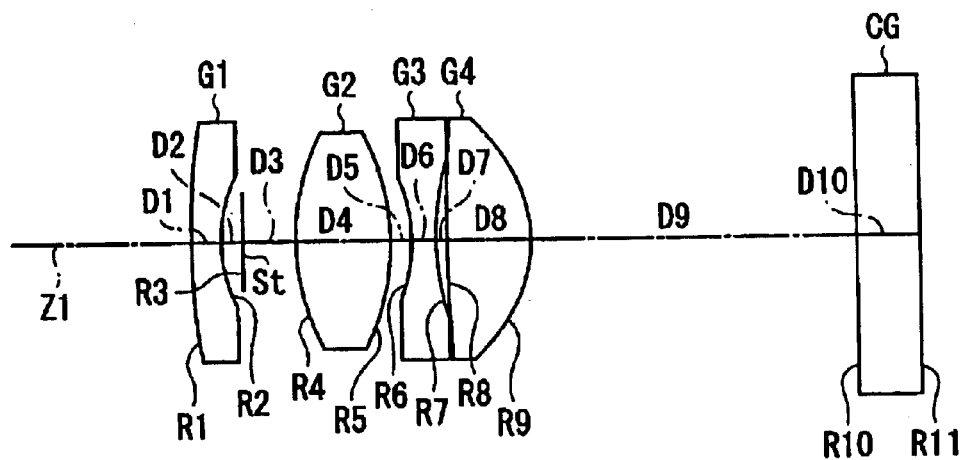
FIG. 4 shows the basic lens element configuration of a single focus lens according to Embodiment 4 of the present invention.

FIG. 4 shows the basic lens element configuration of a single focus lens according to Embodiment 4 of the present invention. Although the lens construction parameters differ in their details, as is apparent by comparing Table 7 below with Table 5 above, the basic lens element configuration is the same as in Embodiment 3. In this embodiment, just as in Embodiment 3, both lens surfaces of the first lens G1 (surfaces #1 and #2) and the image-side surface of the fourth lens G4 (surface #9) are aspherical.

Table 7 below lists the surface number #, in order from the object side, the radius of curvature R (in mm) of each surface near the optical axis, the on-axis surface spacing D (in mm), as well as the index of refraction $N_d$ and the Abbe number $v_d$ (at the d-line, λ=587.6 nm) of each optical element according to Embodiment 4 of the present invention, including the cover glass CG. The bottom portion of Table 7 lists the focal length f, the F-number $F_{NO}$, the picture angle 2ω, as well as the values of the ratios listed in Conditions (1)–(3) for Embodiment 4.

TABLE 7

| # | R | D | $N_d$ | $v_d$ |
|---|---|---|---|---|
| 1* | 33.822 | 0.600 | 1.56865 | 58.6 |
| 2* | 3.500 | 0.450 | | |
| 3 (stop) | ∞ | 1.082 | | |
| 4 | 4.963 | 1.925 | 1.88300 | 40.8 |
| 5 | −4.963 | 0.431 | | |
| 6 | −3.500 | 0.500 | 1.76182 | 26.5 |
| 7 | 5.822 | 0.213 | | |
| 8 | 35.772 | 1.700 | 1.56865 | 58.6 |
| 9* | −2.981 | 6.679 | | |
| 10 | ∞ | 1.300 | 1.51680 | 64.2 |
| 11 | ∞ | | | |

| f = 6.88 mm | $F_{NO}$ = 3.5 | 2ω = 54.6° |
|---|---|---|
| \|R1/R2\| = 9.663 | D5/Ymax = 0.131 | D2/f = 0.065 |

As is apparent from comparing the values listed in the last row of Table 7 with Conditions (1)–(3), Conditions (1)–(3) are each satisfied for this embodiment.

Table 8 below lists, for the aspherical surfaces (#1, #2 and #9 above), the values of the constant K and of the aspherical coefficients $A_4$, $A_6$, $A_8$, and $A_{10}$ for Equation (A) above.

TABLE 8

| # | K | $A_4$ | $A_6$ | $A_8$ | $A_{10}$ |
|---|---|---|---|---|---|
| 1 | −1.68592E+1 | 5.09878E−3 | −4.71739E−4 | 1.08829E−5 | 8.21771E−8 |
| 2 | 2.42457 | 4.00232E−3 | 2.86865E−4 | −2.53512E−7 | 6.94331E−9 |
| 9 | −2.55313E−2 | −2.56371E−3 | −1.88366E−4 | 4.75280E−6 | −1.95777E−8 |

An "E" in the data above indicates that the number following is the exponent to the base 10. For example, "1.0E-02" represents $1.0 \times 10^{-2}$.

FIGS. 8(A)–8(D) show the spherical aberration, astigmatism, distortion and lateral color, respectively, of the single focus lens according to this embodiment. The spherical aberrations are shown for the wavelengths of 587.6 nm (the d-line), 486.1 nm (the F-line), and 656.3 nm (the C C-line). In FIGS. 8(B) and 8(C) the aberrations shown are for the d-line, and in FIG. 8(D) the aberrations are for, as indicated, 486.1 nm (the F-line) and 656.3 nm (the C-line). Also in these drawings, ω is the half-image angle. As is apparent from these figures, the various aberrations are favorably corrected for Embodiment 4.

The invention being thus described, it will be obvious that the same may be varied in many ways. For example, the radius of curvature of each lens element R, the surface spacings D, the index of refraction $N_d$, and the Abbe number $v_d$ are not limited to the specific values given, and may vary. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens comprising, in order from the object side:
   a first lens of negative refractive power having a concave surface on the image side;
   a stop;
   a second lens of positive refractive power having a convex surface on the object side;

a third lens of negative refractive power having a concave surface on the object side; and a fourth lens of positive refractive power and having a convex, aspherical surface on its image side such that the refractive power of the fourth lens becomes weaker towards the edge of the lens;

wherein the following Conditions (1) and (2) are satisfied

|R1/R2|>2     Condition (1)

D5/Ymax>0.05     Condition (2)

where

R1 is the radius of curvature near the optical axis of the object-side surface of the first lens, R2 is the radius of curvature near the optical axis of the image-side surface of the first lens, D5 is the on-axis spacing between the second lens and the third lens, and Ymax is the maximum image height.

2. The single focus lens of claim 1, wherein both sides of the fourth lens are aspherical.

3. The single focus lens of claim 1, wherein the first lens consists of a single lens element.

4. The single focus lens of claim 1, wherein the second lens consists of a single lens element.

5. The single focus lens of claim 1, wherein the third lens consists of a single lens element.

6. The single focus lens of claim 1, wherein the fourth lens consists of a single lens element.

7. A single focus lens comprising, in order from the object side:

a first lens of negative refractive power having a concave surface on the image side and having at least one aspherical surface;

a stop;

a second lens of positive refractive power having a convex surface on the object side;

a third lens of negative refractive power having a concave surface on the object side; and a fourth lens of positive refractive power and having an aspherical convex surface on its image side such that said positive refractive power becomes weaker towards the edge of the lens;

wherein the following Conditions (1)–(3) are satisfied:

|R1/R2|>2     Condition (1)

D5/Ymax>0.05     Condition (2)

D2/f<0.1     Condition (3)

where

R1 is the radius of curvature near the optical axis of the object-side surface of the first lens, R2 is the radius of curvature near the optical axis of the image-side surface of the first lens, D5 is the on-axis spacing between the second lens and the third lens, Ymax is the maximum image height, D2 is the on-axis spacing between the first lens and the stop, and f is the focal length of the single focus lens.

8. The single focus lens of claim 7, wherein the image side surface of the first lens is aspherical.

9. The single focus lens of claim 7, wherein the first lens consists of a single lens element.

10. The single focus lens of claim 7, wherein the second lens consists of a single lens element.

11. The single focus lens of claim 7, wherein the third lens consists of a single lens element.

12. The single focus lens of claim 7, wherein the fourth lens consists of a single lens element.

* * * * *